(12) United States Patent
Ogino et al.

(10) Patent No.: US 7,266,098 B2
(45) Date of Patent: Sep. 4, 2007

(54) WIRELESS POSITION MEASUREMENT METHOD AND WIRELESS POSITION MEASUREMENT SYSTEM

(75) Inventors: Atsushi Ogino, Tokyo (JP); Ryota Yamasaki, Tokyo (JP); Katsuhiko Tsunehara, Tokyo (JP); Naoto Matsuzawa, Kawaguchi (JP); Hideya Suzuki, Ichikawa (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 10/956,115

(22) Filed: Oct. 4, 2004

(65) Prior Publication Data
US 2005/0078626 A1     Apr. 14, 2005

(30) Foreign Application Priority Data
Oct. 9, 2003   (JP)   ............................. 2003-350220

(51) Int. Cl.
*H04Q 7/00* (2006.01)
*H04Q 7/20* (2006.01)

(52) U.S. Cl. ...................... 370/328; 370/338; 455/456; 455/522

(58) Field of Classification Search ................ 370/328, 370/329, 334; 455/456.1, 456.2
See application file for complete search history.

(56) References Cited

U.S. PATENT DOCUMENTS

| | | | | |
|---|---|---|---|---|
| 6,208,874 | B1 * | 3/2001 | Rudisill et al. | 455/575.4 |
| 6,272,356 | B1 * | 8/2001 | Dolman et al. | 455/575.3 |
| 2002/0191554 | A1 * | 12/2002 | Kondo | 370/328 |

FOREIGN PATENT DOCUMENTS

JP         2002-14152         6/2000

\* cited by examiner

*Primary Examiner*—Quochien B. Vuong
*Assistant Examiner*—Richard Chan
(74) *Attorney, Agent, or Firm*—Reed Smith LLP; Stanley P. Fisher, Esq.; Juan Carlos A. Marquez, Esq.

(57) ABSTRACT

A method and system for detecting the position of a mobile unit efficiently and with high precision in a multipath environment. A wireless position detection system made up of a mobile station containing a wireless communication means to allow sending and receiving multiple to and from mutually different antenna positions and, a base station for performing wireless communication with mobile stations containing a wireless communication means and, multiple wireless receivers for receiving each of the multiple signals sent by the wireless communication means between the base stations and, a server for detecting the position of the mobile station from each wireless receiver and from the position of the base station, and the time relating to received signals measured by the multiple wireless receivers.

12 Claims, 6 Drawing Sheets

WIRELESS POSITION
MEASUREMENT SYSTEM

CLAIM OF PRIORITY

The present application claims priority from Japanese application JP No. 2003-350220 filed on Oct. 9, 2003, the content of which is hereby incorporated by reference into this application.

FIELD OF THE INVENTION

The present invention relates to a wireless position detection method and more particularly to a wireless position detection method for wireless local area networks (hereafter wireless LAN).

BACKGROUND OF THE INVENTION

A wireless position detection system for terminals using wireless LAN previously applied for by the present inventors is disclosed in U.S. Pat. No. 101,463,608. In this system, the wireless signals exchanged between the terminal and the base station are received by multiple other base stations separate from that base station, and the position of the terminal is detected based on the reception timings for the respective measured signals. A chip clock differential of ±25 ppm is specified for base stations conforming to IEEE802.11. This clock contains an individual (error) so as shown in FIG. 7, the clock differential between base stations varies with time. However, if within about a dozen seconds, this change is nearly the same as in the linear equation. Therefore, as shown in U.S. Pat. No. 101,463,608 previously disclosed by the present applicants, multiple wireless signals are required from the base station in order to calculate the clock differential between base stations.

On the other hand, when operating these type of wireless position detection systems in environments with walls that reflect the wireless signal such as within buildings, the waveform of the wireless signal becomes distorted by the multipath environment, and the error when determining the reception timing at each station increases. In the method disclosed previously in JP-B No. 030281/2003 by the applicants, the base station receives multiple signals from the terminals and reduces the ranging error on the multipath environment by averaging the reception timing for each measured signal.

In view of the above two points, utilizing multiple wireless signal proves effective. However, the time required for wireless communication increases with the number of signals. In particular, when detecting the positions of high speed mobile units, every effort must be made to avoid longer wireless communication times during the sending and receiving of multiple wireless signals.

[Patent document 1]
JP-A No. 014152/2002

SUMMARY OF THE INVENTION

The major problem is therefore how to efficiently detect the position of a mobile unit with high precision in a multipath environment.

In order to resolve the aforementioned problems with the related art, one aspect of the present invention is a wireless position detection system made up of a mobile station containing a wireless communication means capable of sending and receiving to and from multiple mutually different antenna positions and; a base station for conducting wireless communications with the mobile station containing the wireless communication means and; multiple wireless receivers for receiving the respective multiple wireless signals exchanged between the wireless communication means and the base station and; a server to detect the position of the mobile station from the time the wireless signals measured by the multiple receivers were received and the positions of the respective wireless receivers, and the position of the base station.

The present invention is capable of obtaining different signals with multipath characteristics on receivers by a wireless receive means capable of sending and receiving to and from different antenna positions used by the mobile stations and by measuring the wireless signals exchanged among base stations with the wireless receivers. The present invention can therefore effectively reduce the position detection error in multipath environments. The position of the mobile station can be efficiently detected since the wireless signals sent on the wireless communication means via multiple mutually different antenna positions from the base station are utilized as the multiple wireless signals from the necessary base stations, and the reception timing at each wireless device is then determined.

DETAILED DESCRIPTION OF THE PREFERRED EMBODIMENTS

Figure 1:
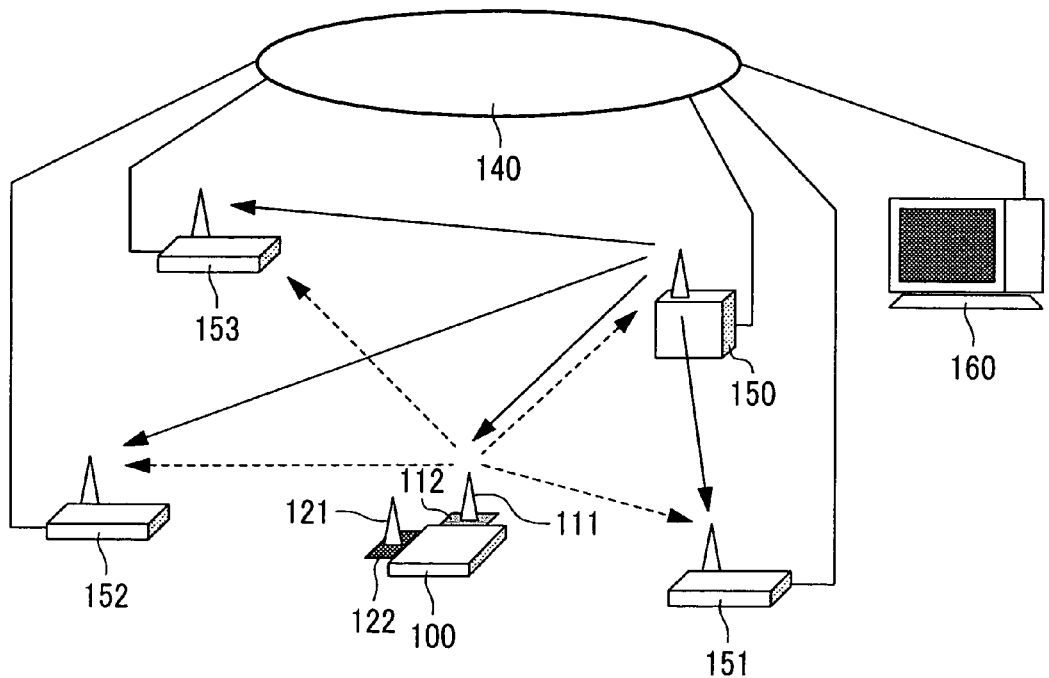
FIG. 1 is a concept view showing the embodiment of the wireless position detection system of the present invention.

An embodiment of the wireless position detection system according to the present invention is explained using FIG. 1. In this figure, the reference numeral 100 denotes a mobile station, 150 denotes a wireless LAN base station (hereafter base station), 151, 152, 153 denote wireless LAN receivers (hereafter, receivers), 160 denotes a server, and 140 denotes a local area network (LAN). The mobile station 100 contains antenna 111, 121, and wireless communication means 112, 113. The receivers 151, 152, 153 may have a receive function and may, for example, be wireless LAN access points. However, their role in the position measurement method for terminal is different from the base station 150 so hereafter a term different from the base station 150 is used for simplicity in the description. The wireless communication means may, for example, be a wireless LAN terminal and communicates by radio (wireless) with the base station 150 using the respective antennas. The distance between adjacent antennas is preferably one-quarter wavelength or more of the wireless signal that the wireless communication means is using. In a multiplex environment, isolating the antennas from each other in this way allows the receivers to receive different signals with multipath characteristics.

The distance between each antenna is preferably less than the size of the quotient (units in meters) found from dividing 10 to the 7th power (units are meters×Hertz) by the frequency bandwidth (units in Hertz) taken up by the wireless signal used by the wireless communication means. According to "Information Processing Society DICOMO2003 Symposium No. 141" this will maintain an accuracy of approximately 10 meters for GPS (Global Positioning Systems) and a positioning accuracy of approximately one meter in wireless LAN position detection systems conforming to IEEE802.11b and is therefore effective in suppressing an increase in error in position detection results due to differences in the respective antenna positions.

The base station 150 performs wireless communication with multiple wireless communication means 112, 122 of the mobile stations, based on commands from the server 160 connected via the LAN 140. The receivers 151, 152, 153 receives, samples, digitizes and accumulates the wireless signals exchanged between the wireless communication means 112, 122 and base station 150 based on the server 160 commands. The receivers 151, 152, 153 also record these accumulated times measured with clocks contained in the receivers. The server 160 calculates the mobile station position based on the accumulated times and wireless signals accumulated by each receiver, and the positions of each receiver, and the position of the base station.

Figure 2:
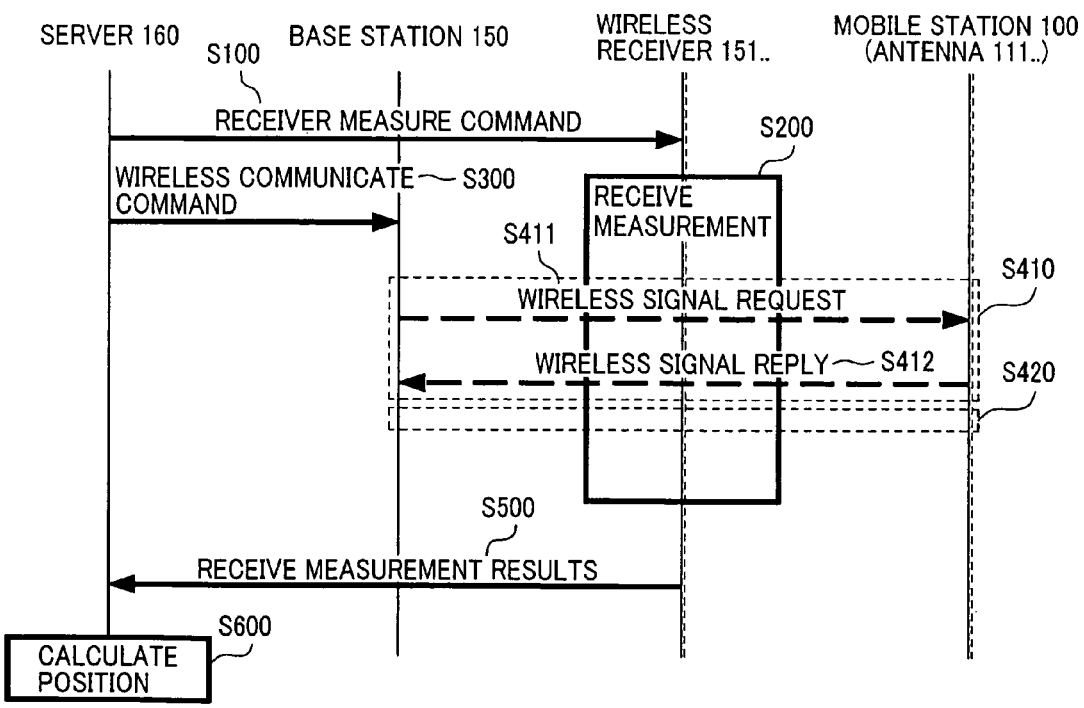
FIG. 2 is a flow diagram showing the embodiment of the wireless position detection method of the present invention.

The embodiment of the wireless position detection method according to the present invention is described next using FIG. 2. The server 160 instructs the receivers 151, 152, 153 to receive a wireless signal between the base station 150 and the wireless communication means 112 and 122 (S100). The receivers 151, 152, 153 commence receive measurement (S200). The server 160 instructs the base station 150 to communicate with the wireless communication means 112 and 122 (S300). The base station 150 communicates (radio or wireless) respectively with the wireless communication means 112, 122 (S410, S420). The wireless communication between the base station and wireless communication means is the exchanging of wireless signals. For example, the base station 150 sends a wireless signal to the wireless communication means 112 requesting the transmission of a specific wireless signal (S411). The wireless communication means 112 sends a wireless signal in response to this request to the base station 150 (S412). The base station 150 sends a signal for this request (in S420) to the wireless communication means 122 (S421), and the wireless communication means 122 sends a reply wireless signal in response to that signal (S422). A specified data packet may for example be used in the wireless signal for making this request, and an ACK packet may be used for the data packet in the wireless signal sent in response to the request. Alternatively, an RTS (request to send) packet may for example be used in the wireless signal for making the request; and a CTS (clear to send) packet may be used for the RTS packet in the wireless signal sent as the reply. In either of these examples, in wireless communication means conforming to IEEE802.11, the sending of the wireless signals for making requests and responses can be achieved by previously included functions. General-purpose wireless LAN terminals conforming to IEEE802.11 can therefore be utilized in the wireless communication means which will prove effective in terms of cost. The same wireless frequency channels may be utilized during wireless communication of the base station 150 with the wireless communication means 112, 122 (S410, S420). Using the same channels suppresses the occurrence of processing delays due to the base station having to change the wireless frequency channels during operation, and efficiently detects the position of the mobile station.

The receivers 151, 152, 153 receive the wireless signals by wireless communication (S410, S420). The receivers 151, 152, 153 also sample, digitize, and accumulate the signals, and also record the accumulated times measured with the clocks on each receiver (S200). Finally, the receivers 151, 152, 153 send the measured results including the accumulated times and accumulated contents of the respectively received signals to the server 160 (S500). The server 160 then calculates the position of the mobile station based on the measured results from each receiver, the position of each receiver, and the position of the base station (S600).

Figure 3:
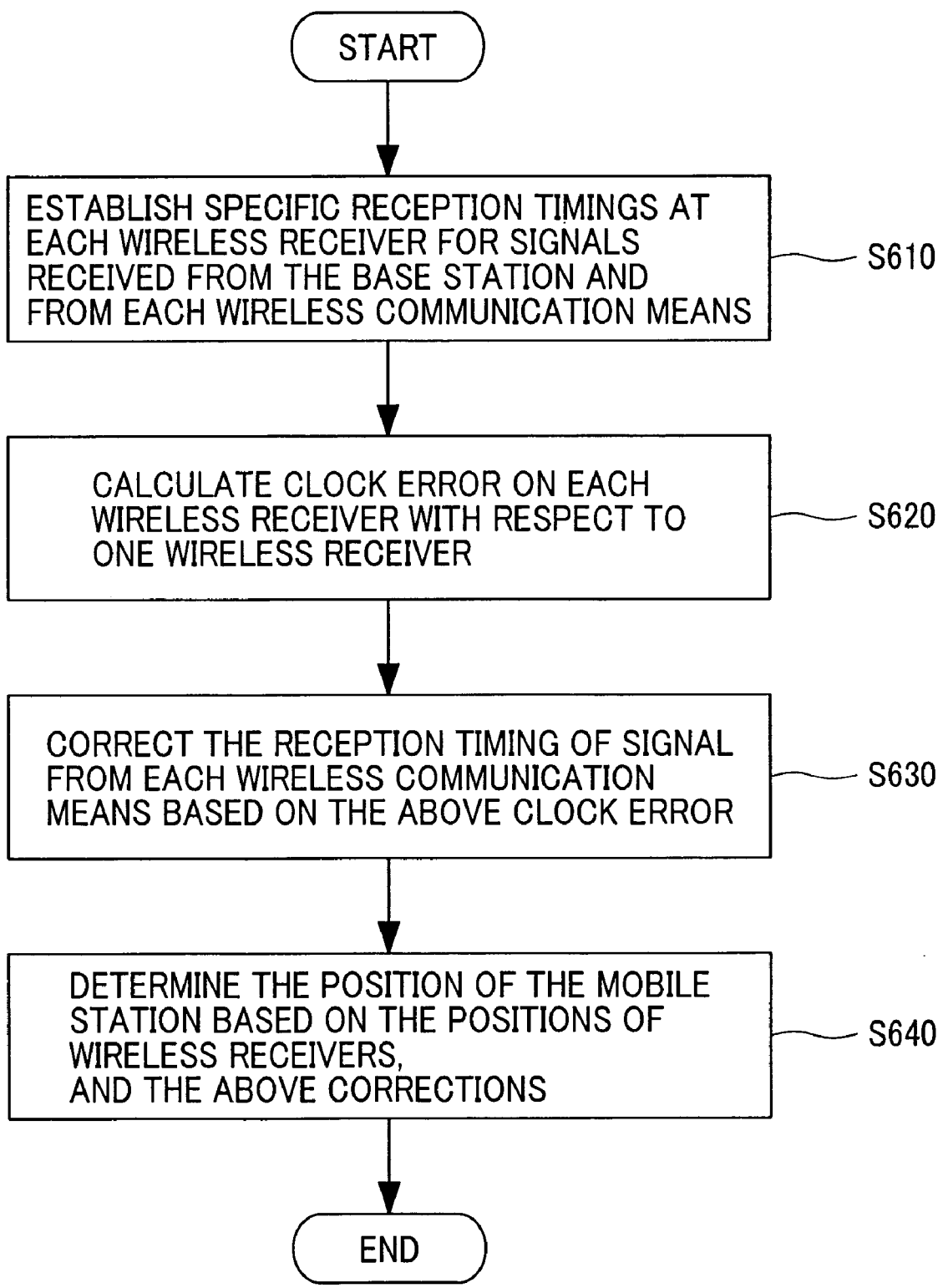
FIG. 3 is a flow diagram showing an embodiment for calculating the position in the wireless position detection method of the present invention.

The embodiment for calculating the position (S600) in the wireless position detection method of the present invention is described next while referring to FIG. 3.

In the initial step, the reception timings for each wireless signal at the receiver are established based on accumulated times and the accumulated receive signal contents in each receiver $15j$ ($j=1,2,\ldots$) and the respective transmitted wireless signals (wireless signal request) sent to the wireless communication means 121, 122 from the base station 160 and the wireless signals replying (wireless signal reply) to those signals (S610). A method for example such as disclosed in JP-A No. 197863-2000 (Patent document 1) is utilized to establish the reception timing. Here, the reception timing at the receiver $15j$ ($j=1,2,\ldots$) that received the wireless signal sent (to ?) wireless means $12i$ ($i=1,2,\ldots$) from the base station 160 is established as $T\_\{m\_i@j\}$; also the reception timing at the receiver $15j$ ($j=1,2,\ldots$) for wireless signals sent to the base station 150 from the wireless means $12i$ ($i=1, 2, \ldots$) is established as $T\_\{i\_m@j\}$.

In the next step, the clock error versus a specific receiver is calculated for the reception timings established for each receiver (S620). When the receiver receives a wireless signal request to wireless means $12i$ ($i=1,2\ldots$) from the base station 150, the clock error $E\_\{j\_1, m\_i@j\}$ on the receiver $15j$ ($j=1,2,\ldots$) versus the receiver 151 is found as shown next.

$$E\_\{j\_1,m\_i@j\}=T\_\{m\_i@j\}-T\_\{m\_i@1\}-(\|Pj-Pm\|-\|P1-Pm\|)/c \qquad \text{Eq. 1}$$

Here, Pj is the position of the receiver $15j$ ($j=1,2,\ldots$) Pm is the base station position, c is the radio wave propagation speed, and $\|x\|$ is the Euclidean norm of the vector x.

In the third step, the reception timing $T\_\{i\_m@j\}$ at the receiver $15j$ ($j=1,2,\ldots$) of the wireless signal sent to the base station 150 via the wireless means $12i$ ($i=1,2\ldots$) is corrected by utilizing the clock error calculated as described above (S630) The clock errors among these receivers changes over time. Therefore, the clock errors for the receiver, and time information for when that time was acquired is needed in order to accurately estimate the reception timing $T\_\{i\_m@j\}$. This embodiment of the present invention utilizes the multiple clock errors acquired from wireless signals sent from the base station via multiple wireless means, and also utilizes the time that these errors were acquired. For example, the reception timing $R\_\{i\_m@j,1\}$ at the receiver $15j$ ($j=1,2,\ldots$) for wireless signals sent from the wireless communication means $12i$ (i=1,2, . . . ) to the base station 150, is corrected based on the clock of the receiver 151 as follows.

$$R\_\{i\_m@j,1\} = T\_\{i\_m@j\} - E\_\{i\_m@j,1\} \quad \text{Eq. 2}$$

Here, E_{i_m@j,1} is the error on the receiver 151 clock versus the reception timing that the signal sent from wireless communication means 12$i$ (i=1,2, . . . ) to the base station 150 was received on receiver 15$j$ (j=1,2, . . . ). The clock error E_{j_1, i_m@j}(or more simply denoted by E_{i_m@j,1}) is calculated from equation 3 by applying the Lagrange interpolation formula using at least 2 sets (i=1,2) for the pair made up of the clock error E_{j_1, m_i@j}(or more simply denoted by E_{m_i@j,1}) on the receiver 15$j$ (j=1,2, . . . ) versus the receiver 151 clock, and the corresponding reception timing T_{i_m@j}.

$$E\_\{i\_m@j, 1\} = \sum_{k=1}^{2} \left( \prod_{\substack{h=1 \\ h \neq k}}^{2} \frac{T\_\{i\_m@j\} - T\_\{m\_h@j\}}{T\_\{m\_k@j\} - T\_\{m\_h@j\}} \right) E\_\{m\_k@j, 1\} \quad \text{Eq. 3}$$

When acquiring three or more sets (i=1,2,3 . . . ) for the pair comprised of the clock error E_{j_1, m_i@j} on the receiver 15$j$ (j=1, 2, . . . ) versus the receiver 151 clock, and the corresponding reception timing T_{i_m@j}, for mobile stations having three or more wireless communication means 12$i$ (i=1,2 . . . ); a function such as the regressive formula can be used for the clock error E_{j_1, m_i@j} of reception timing T_{i_m@j} and this regressive formula used to find the clock error E_{i_m@j,1}.

In the fourth step, the mobile station position is determined based on the position of each receiver and the corrected reception timings (S640). Here, the time that the signal from the mobile station was received at the receiver 15$j$ is set as time R_{t_m@j, 1} using the receiver 151 clock as a reference (standard).

The position Pt of the mobile station is calculated as the most plausible (maximum likelihood) solution for the simultaneous equations per equation (4), from the positions Pj (j=1,2, . . . ) of each receiver and from the reception timings R_{t_m@j, 1} (j=1,2, . . . ) at the receivers of the wireless signals sent from the base stations.

$$\{\|Pt-Pj\| - \|Pt-P1\| = c(R\_\{t\_m@j,1\} - R\_\{t\_m@1, 1\}), j=2,3, \quad \text{Eq. 4}$$

The wireless signals with the reception timings R_{t_m@j, 1} are for example received from the multiple wireless communication means on the respective receiver 15$j$ and the average value for i of reception timings R_{i_m@j, 1} (i=1,2, . . . ) is given from equation 5.

$$R\_\{t\_m@j, 1\} = \frac{1}{N} \sum_{i=1}^{N} R\_\{i\_m@j, 1\} \quad \text{Eq. 5}$$

Here, the value N is the number of wireless communication means including the mobile station.

The position Pt of the mobile station may also be calculated as an average value for i (1,2, . . . ) of the communication wireless means antenna position Pti calculated by equation 4 after substituting the above reception timing R_{t_m@j, 1} with the reception timing R_{i_m@j, 1}.

Further, in another formula relating to j of equation 4, the position Pt of the mobile station can be calculated as the most plausible (maximum likelihood) solution for equation 4 comprised of simultaneous equations including the number of receivers of N set simultaneous equations obtained after substituting the reception timings R_{t_m@j, 1} with the reception timing R_{i_m@j, 1} (i=1, . . . , N).

In either of these methods, the error in establishing each reception timing can be smoothed out (thinned) by utilizing the reception timing of signals with different multipath characteristics. Consequently, errors in detecting the position of the mobile station can therefore be reduced. Also, estimating the mutual clock errors of the receivers is necessary in order to establish the reception timings of signals at each receiver from the wireless communication means. To find the mutual clock error, each receiver must receive the multiple wireless signals sent from the base station. In the method of the embodiment of the present invention, the position of the mobile station can be efficiently detected since multiple signals were utilized as wireless signals sent from the base station to the wireless communication means. In the above description, the mobile station 100 used two antennas and two wireless communication means. However to improve the measurement accuracy still further, three or more antennas and three or more wireless communication devices may be provided.

The second embodiment of the wireless position detection system of the present embodiment is described next while referring to FIG. 4. The mobile station 100 is the unique feature compared to the structure shown in FIG. 1. The mobile station in FIG. 4 contains a rotating shaft 114 for changing the antenna position of the antenna 111 versus the wireless communication means 112. The distance between the center of the shaft and the rotating locus (path) of the antenna edge is preferably 1 quarter wavelength or more of the wireless signal sent by the wireless means. The rotation of this shaft preferably has an angular speed changing π/3 (radians) in the time between one wireless communication (S410) and that next wireless communication (S420).

The value (units in meters) twice the distance between the center of the shaft and the rotating path of the antenna edge is preferably less than the size (units in meters) of the quotient found by dividing 10 to the 7th power (units are meters×Hertz) by the frequency bandwidth occupied by the wireless signal used by the wireless communication means.

Figure 4:
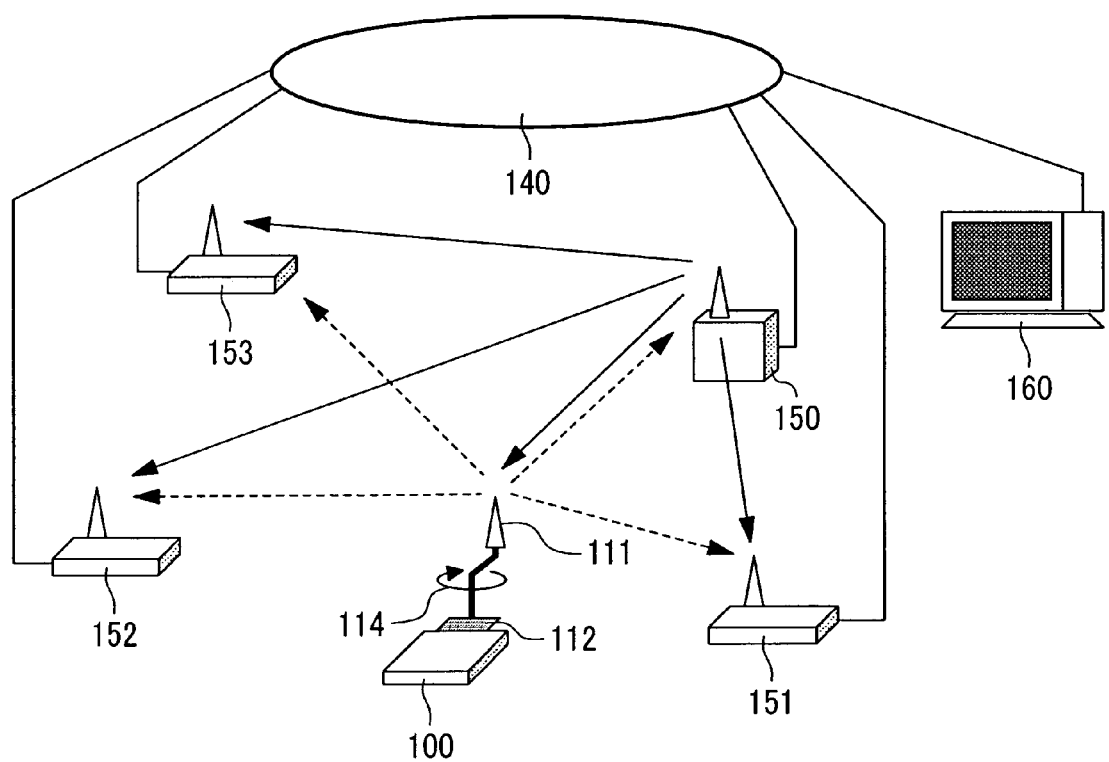
FIG. 4 is a concept view showing the second embodiment of the wireless position detection system of the present invention.

A description of sections of FIG. 4 identical to sections described for FIG. 1 is omitted. The wireless position detection method in this system can be implemented with a single wireless communication means compared to the multiple wireless communication means in the flow diagrams in FIG. 2 and FIG. 3 and can utilize multiple mutually different antenna positions. If the position where receiving of the signal from the base station 150 and the sending of the reply signal for that (received) signal is a quarter length or more of the wireless signal then this embodiment renders the effect that signals with different multipath characteristics can be received on the receiver even if the parameters for deciding the antenna position are different from those described above.

Figure 5:
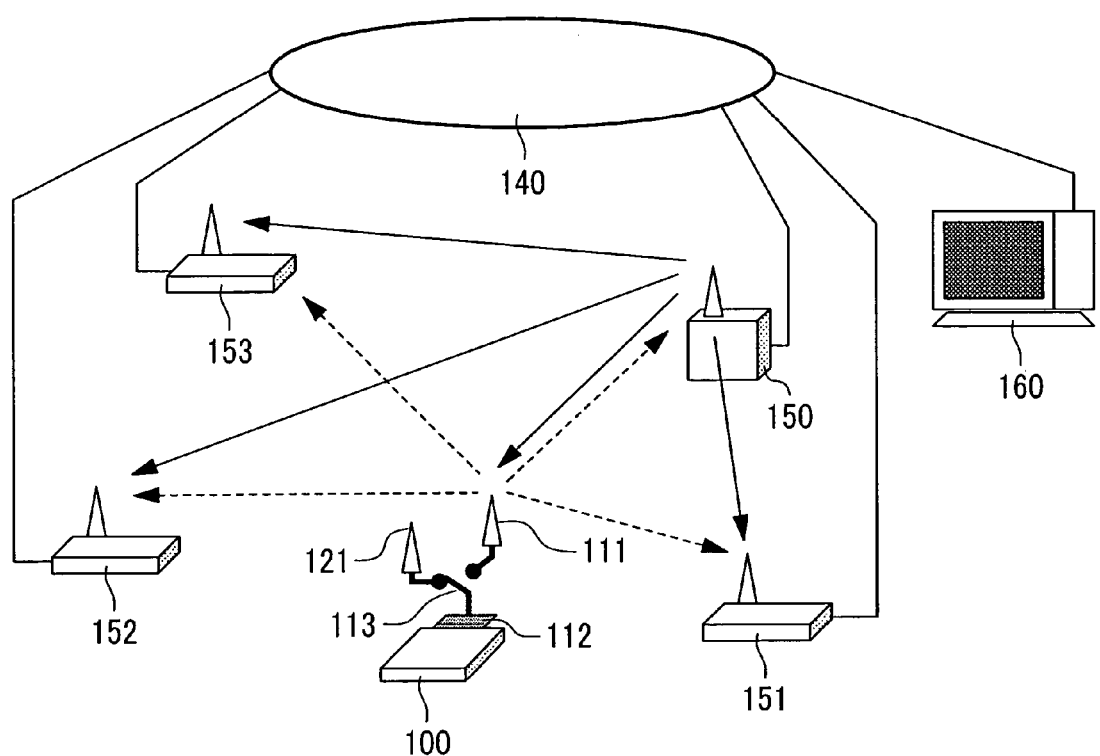
FIG. 5 is a concept view showing the third embodiment of the wireless position detection system of the present invention.

The third embodiment of the wireless position detection system of the present invention is described while referring to FIG. 5. The mobile station 100 is the unique feature compared to the structure shown in FIG. 1. The mobile station in FIG. 5, contains the multiple antennas 111, 121, a wireless communication means 112, and a switch 113 for selecting one from among multiple antennas. The distance (gap) between antennas is preferably one-quarter wavelength or more of the wireless signal used by the wireless communication means. Separating the antennas in this way in a multipath environment, allows each of the receivers to receive signals with different multipath characteristics.

The distance between antennas is preferably less than the size (units in meters) of the quotient found from dividing 10 to the 7th power (units are meters×Hertz) by the frequency bandwidth occupied by the wireless signal used by the wireless communication means. The measurement accuracy varies according to the frequency bandwidth occupied by the wireless signal used for position measurement but based on experience, the distance between antennas found from the above described calculation is equivalent to approximately half the distance of the measurement accuracy (error range) corresponding to occupied frequency bandwidth.

A description of sections in FIG. 5 identical to the previous descriptions in FIG. 1 is omitted here.

Figure 6:
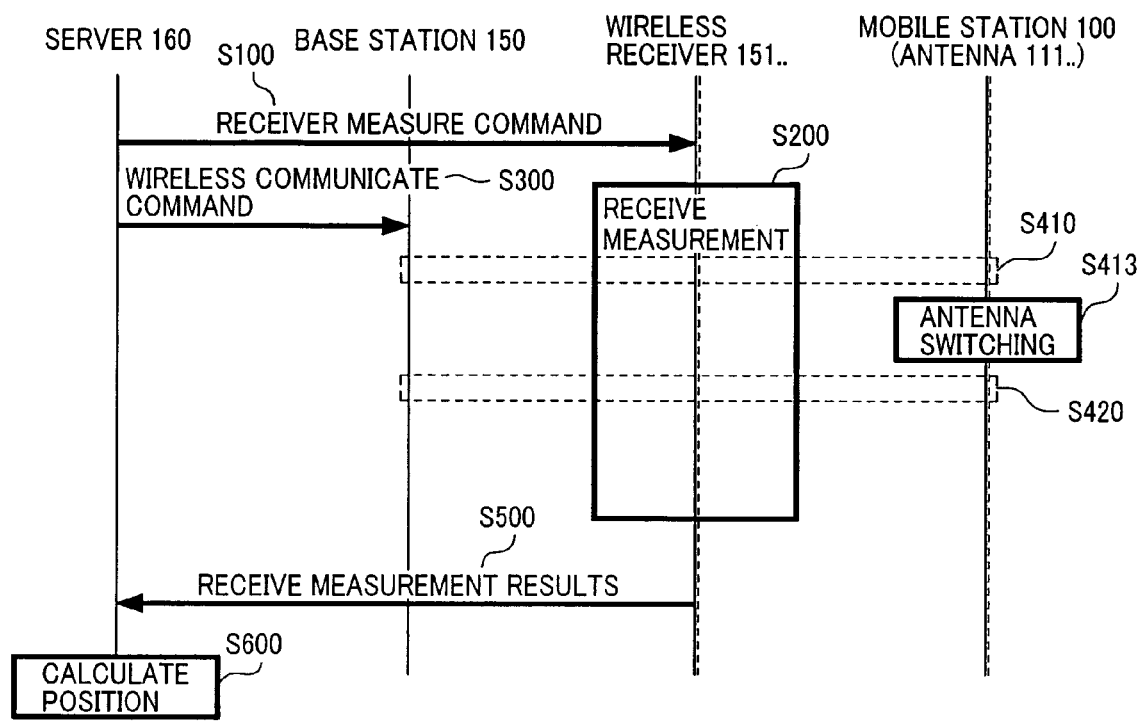
FIG. 6 is a flow diagram showing another embodiment for calculating the position in the wireless position detection method of the present invention.
Figure 7:
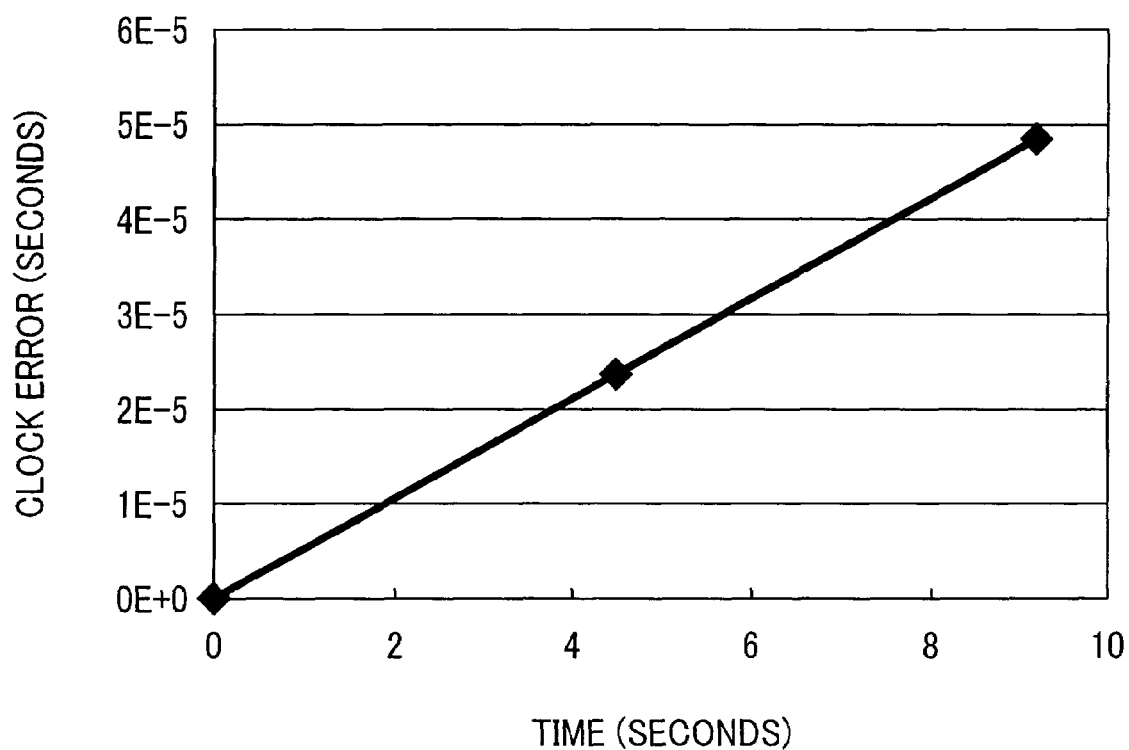
FIG. 7 is a graph showing the changes over time in the clock error in the present invention.

The wireless position detection method using this system is described next while referring to FIG. 6. A unique point compared to the flow diagram of FIG. 2 is a step (S413) for a switch 113 to sequentially switch to the antenna used for the next communication after each transmission of a wireless signal to the base station. Also, the operations by the multiple wireless communication means shown in the flow diagrams of FIG. 2 and FIG. 3 can each be implemented at mutually different antenna positions with a single wireless communication means as shown in the flow diagrams in FIG. 3 and FIG. 6.

What is claimed is:

1. A wireless position detection system containing a mobile station, a base station for conducting wireless communication with the mobile station, multiple wireless receivers, and a server connected by way of a network to the base station and the multiple wireless receivers, wherein
    the mobile station contains a send/receive section for sending and receiving wireless signals at first and second antenna positions, the multiple wireless receivers contain a receive timing measurement section,
    each receive timing measurement section receives a reference signal sent from the base station to the send/receive section of the first and second antenna positions of the mobile station, measures the reference signal receive timing, receives the first and second mobile station signals sent from the send/receive section of the first and second antenna positions of the mobile station, measures the first and second mobile station signal receive timing, and conveys the reference signal receive timing and the first and second mobile station signal receive timing to the server,
    the server calculates the position of the mobile station based on the first and second mobile station signal receive timing, and the respective reference signal receive timing of the wireless receivers conveyed to the server from the multiple wireless receivers, and
    the mobile station send/receive section contains a first send/receive antenna and a second send/receive antenna at the respective first and second antenna positions.

2. A wireless position detection system according to claim 1, wherein the mobile station sends and receives the wireless signals by time-sharing of the first and second send/receive antennas.

3. A wireless position detection system according to claim 1, wherein the mobile station send/receive section contains a movement mechanism to move and install one of the send/receive antenna devices in the first antenna position or the second antenna position; and the mobile station signal is sent when the send/receive antenna device is in the first antenna position or the second antenna position.

4. A wireless position detection system according to claim 1, wherein the multiple wireless receivers measure the receive timing on the respective wireless receivers by utilizing the mutually non-synchronized clocks.

5. A wireless position detection system according to claim 4, wherein the server calculates and corrects the error on the non-synchronized clocks using the reference signal receive timing measured on the multiple wireless receivers and the position information on the multiple receivers and the base station.

6. A wireless position detection system according to claim 1, wherein the first and the second antenna positions are positions separated by a distance less than half the measurement accuracy determined according to the frequency bandwidth occupied by the wireless signal.

7. A wireless position detection method for measuring the position of a mobile station, utilizing a mobile station, a base station for conducting wireless communications with the mobile station, multiple wireless receivers, and a server connected by way of a network with the base station and the multiple wireless receivers, wherein
    the mobile station sends to and receives from the base station wireless signals by utilizing a send/receive section capable of sending and receiving wireless signals at first and second antenna positions,
    the multiple wireless receivers receive the reference signal sent from the base station to the send/receive sections of the mobile station first and second antenna positions, measure the reference signal receive timing, receive the first and second mobile station signals sent to the base station from the send/receive sections of the mobile station first and second antenna positions, measure the receive timing of the first and second mobile station signals, and convey the reference signal receive timing and the first and second mobile station signal receive timing to the server,
    the server calculates the position of the mobile station based on the first and second mobile station signal receive timing, and the respective reference signal receive timing of the wireless receivers conveyed to the server from the multiple wireless receivers, and
    the mobile station send/receive section contains a first send/receive antenna and a second send/receive antenna at the respective first and second antenna positions.

8. A wireless position detection method according to claim 7, wherein the mobile station sends and receives the wireless signals by time-sharing of the first and second send/receive antennas.

9. A wireless position detection method according to claim 7, wherein the mobile station send/receive section contains a movement mechanism to move and install one of the send/receive antenna devices in the first antenna position or the second antenna position; and the mobile station signal is sent when the send/receive antenna device is in the first antenna position or the second antenna position.

10. A wireless position detection method according to claim 7, wherein the multiple wireless receivers contain mutually non-synchronized clocks and measure the receive timing by utilizing the clocks in the respective wireless receivers.

11. A wireless position detection method according to claim 10, wherein the server calculates and corrects the error on the non-synchronized clocks using the reference signal receive timing measured on the multiple wireless receivers and the position information on the multiple receivers and the base station.

12. A wireless position detection method according to claim 7, wherein the first and the second antenna positions are positions separated by a distance less than half the measurement accuracy determined according to the frequency bandwidth occupied by the wireless signal.

* * * * *